Nov. 10, 1942.  J. F. LUHRS  2,301,897
TELEMETRIC CONTROL SYSTEM
Filed Nov. 25, 1938  3 Sheets-Sheet 1

Inventor
JOHN F. LUHRS
By Raymond W. Junkins
Attorney

Nov. 10, 1942.  J. F. LUHRS  2,301,897
TELEMETRIC CONTROL SYSTEM
Filed Nov. 25, 1938  3 Sheets-Sheet 2

Inventor
JOHN F. LUHRS
By Raymond W. Junkins
Attorney

Nov. 10, 1942.  J. F. LUHRS  2,301,897
TELEMETRIC CONTROL SYSTEM
Filed Nov. 25, 1938   3 Sheets-Sheet 3

Inventor
JOHN F. LUHRS
By Raymond W. Junkins
Attorney

Patented Nov. 10, 1942

2,301,897

UNITED STATES PATENT OFFICE 2,301,897

TELEMETRIC CONTROL SYSTEM

John F. Luhrs, Cleveland Heights, Ohio, assignor to Bailey Meter Company, a corporation of Delaware Application November 25, 1938, Serial No. 242,251

11 Claims. (Cl. 172—239)

This invention relates to telemetric control systems wherein a receiving means is positioned by one or more transmitting means, each responsive to the magnitude of a variable, such as position, pressure, temperature, rate of flow. More particularly my invention relates to the impulse class of telemeters wherein a receiving means is periodically positioned for a time duration corresponding to the difference in magnitude of a plurality of variables.

Telemetric systems are well known in the art wherein a first transmitting means periodically originates electric signals of a time duration corresponding to a first variable, a second transmitting means simultaneously originates electric signals of a time duration corresponding to a second variable and a receiver means jointly responsive to the signals is selectively positioned in one direction or the other by an amount corresponding to the difference in time duration of the signals. Usually the receiving means is used to control one or the other of the variables to maintain the signals of equal time duration, and hence to maintain a predetermined relation between the variables. Such systems are shown and described, for example, in U. S. Patents 2,046,676 and 2,015,968 to W. E. Dueringer and J. D. Ryder respectively.

An inherent characteristic of such systems is that upon a temporary fault in one of the transmitting means the receiver means is positioned for the entire time duration of the corresponding signals originated by the other transmitting means. A fictitious change in position of the receiver means therefore occurs which is not indicative of the difference in magnitude of the variables, and in the event that the receiver means is used to control one of the variables a violent change in the magnitude of said variable occurs which may lead to the establishment of a hazardous condition. For example, the first variable may be the flow of fuel to a furnace, the second variable the flow of air thereto, and the latter controlled by the receiving means to maintain a predetermined ratio between fuel and air. Upon failure of one or the other of the signals the receiving means would be positioned an excessive amount, so that a violent change in air flow would occur, causing an acute deficiency or great excess of air for combustion.

My invention while relating to the same general class of telemetric systems differs therefrom in that the several transmitting means jointly produce but a single periodic signal of a time duration corresponding to the difference in magnitude of the several variables and that upon a temporary fault in one of the transmitting means the receiving means will remain stationary until normal operation of the transmitting means is restored.

Figure 1:
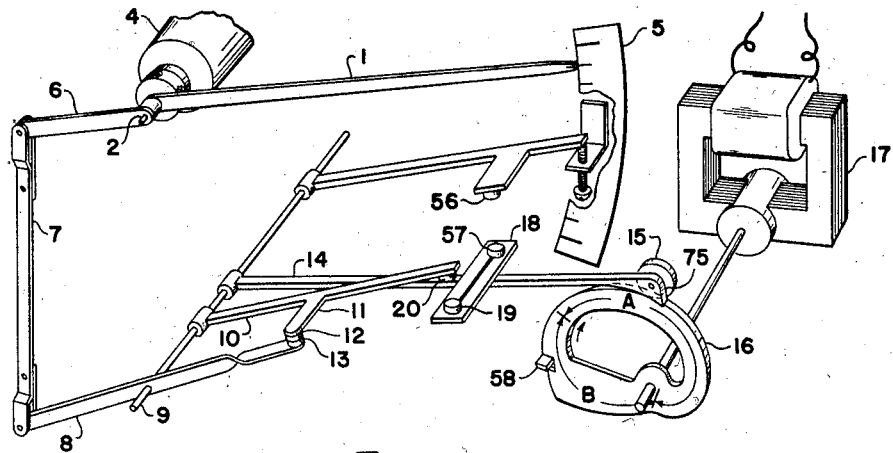
Fig. 1 illustrates a transmitting mechanism.
Figure 2:
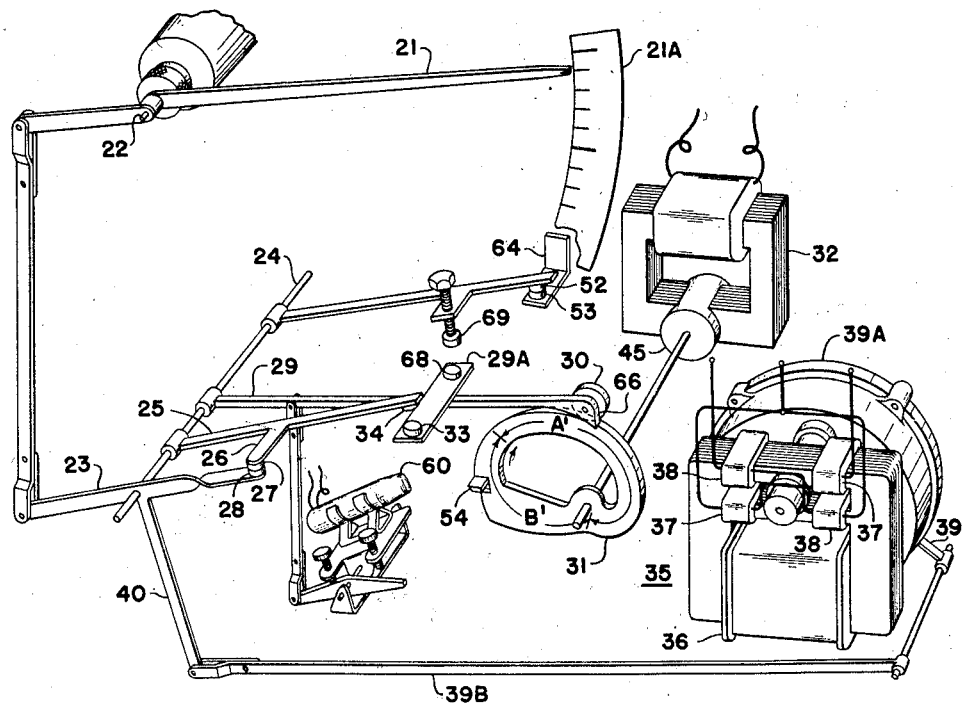
Fig. 2 illustrates a combination transmitting and receiving mechanism which may be used in conjunction with the transmitting mechanism shown in Fig. 1.
Figure 3:
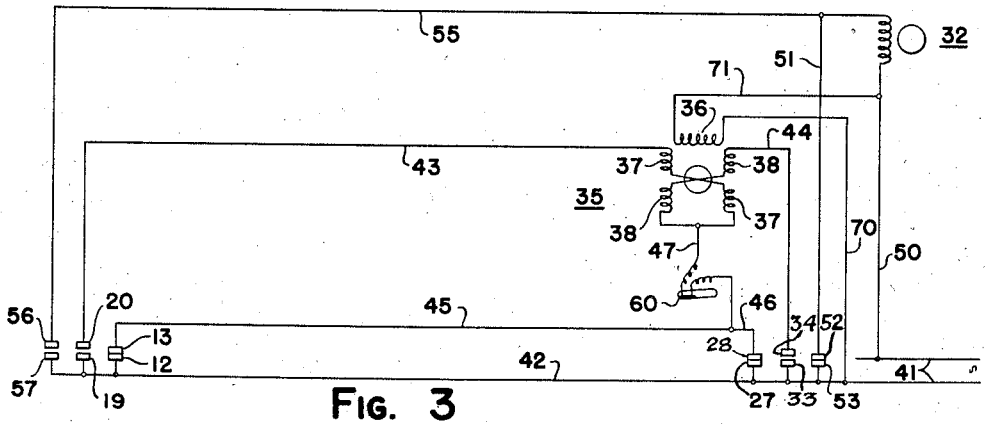
Fig. 3 is a diagram showing the wiring in and between the mechanisms shown in Figs. 1 and 2.

Fig. 1 illustrates the basic transmitting mechanism I employ for originating signals, while Fig. 2 illustrates a transmitting means employing the same basic mechanism as shown in Fig. 1, and incorporated therewith a receiving means which is jointly responsive to both the transmitting means shown in Figs. 1 and 2. For the sake of clarity I have not shown in Figs. 1 and 2 the electrical connections between the several mechanisms. Such connections are shown in Fig. 3 and in a modified form in Fig. 4. I will first describe my invention with reference to Figs. 1, 2 and 3 and then indicate the modifications illustrated in Fig. 4. Throughout the drawings the same reference characters indicate like parts.

Referring now to Figs. 1, 2 and 3, I therein show a pointer 1 secured to a spindle 2 carried in a bearing 4. Cooperating with the pointer 1 is an index 5 suitably graduated so that the position of the pointer 1 may be accurately observed at any time. The spindle 2 may be angularly positioned by a factor such as pressure, temperature, rate of flow, or it may be positioned manually. Regardless of the particular factor which is used to position the spindle 2 it will be observed as the description proceeds that it is the position of the pointer 1 which in part determines the signals transmitted to the receiving means, and that therefore this position may be defined as the "first variable."

The pointer 1 carries a rearwardly extending arm 6 pivotally connected by a link 7 to a lever 8 fulcrumed on a stationary shaft 9. It will be observed that when the pointer 1 is adjacent the lowest graduation on the scale 5 the lever 8 is at its extreme clockwise position and as the pointer 1 is positioned upwardly the lever 8 is positioned in a counterclockwise direction a corresponding amount.

Pivoted on the shaft 9 is a contact member 10 having a laterally extending arm 11 carrying a contact 12 normally resting on a cooperating contact 13 carried by the lever 8. Also pivoted on the shaft 9 is a follower arm 14 carrying a roller 15 normally in contact with a revoluble cam 16. When in operation, the cam 16 is continuously rotated by a self-starting synchronous motor 17 so that the follower arm 14 is periodically or cyclically reciprocated between definite limits which are slightly greater than the limits of travel of the lever 8.

The follower arm 14 carries a transversely extending platform 18 on which is a contact 19 disposed to engage a contact 20 carried by the member 10. It will be noted that during the upward travel of the follower 14 the contact 19 will engage the contact 20 for a time duration corresponding to the position of the pointer 1. Simultaneously with the engagement of the contacts 19 and 20 contacts 12 and 13 will disengage, and remain disengaged while the former are engaged.

Referring now particularly to Fig. 2, it will be observed that the same basic transmitting mechanism is shown. That is to say there is a pointer 21 and a cooperating index 21A. The position of the pointer relative to the index may be taken as the "second variable." The pointer is secured to a spindle 22 and connected to a lever 23 pivotally mounted on a stationary shaft 24. Also pivotally mounted on the shaft 24 is a contact member 25 having a laterally extending arm 26 carrying a contact 27 normally resting on a contact 28 carried by the lever 23. The shaft 24 also pivotally supports a follower 29 carrying a roller 30 normally engaging a cam 31 continuously rotated by a self-starting synchronous motor 32. Carried by the follower 29 is a platform 29A on which is disposed a contact 33 adapted to engage a contact 34 on the member 25.

In operation the cams 16 and 31 rotate at identical speeds by virtue of the synchronous driving motors 17 and 32. The cams are also maintained (by means hereinafter to be described) in exact predetermined phase relationship. That is to say, the speed of the motor 32 is temporarily varied at predetermined time intervals if the roller 30 does not engage the point on the cam 31 corresponding to the point engaged by the roller 15 on the cam 16. The followers 14 and 29 are therefore reciprocated in unison, and if the position of the pointer 1 agrees with the position of the pointer 21 contacts 19 and 20 will engage simultaneously with the engagement of contacts 33 and 34. If such agreement does not exist, then engagement of the said sets of contacts will occur in sequence, the time difference being dependent upon the relative positions of the pointers 1 and 21. Simultaneously disengagement of contacts 12—13 and 27—28 will occur in sequence, the time difference again being dependent upon the relative positions of the pointers 1 and 21.

The receiving means, as shown in Fig. 2, comprises a reversing motor 35 having an energizing field 36, opposed pole windings 37 and 38, and an output arm 39 connected to the rotor of the motor through a suitable gear reduction 39A. It will be understood by those familiar with the art that when the winding 37 is short circuited the output arm 39 will angularly move in one direction, when the winding 38 is short circuited the arm will move in opposite direction, and when both windings are concurrently short circuited or open circuited the arm remains stationary. By circuit arrangements, hereinafter to be described in detail, one or the other of the windings is periodically energized for a time duration corresponding to the difference in magnitude of the first and second variables.

In the mechanism shown in Fig. 2 the arm 39 is shown mechanically coupled through a link 39B to a depending arm 40 of the lever 23, and therefore by direct connection determines the position of the pointer 21, or in other words the magnitude of the second variable. In some cases (as described with reference to Fig. 7) the link 39B may be eliminated and the coupling made by other means, so that while the receiving means controls the magnitude of the second variable, there is no direct mechanical connection between the receiving means and one or the other of the transmitting means. In still other cases it may be desirable to have no connection, either direct or indirect, between the receiving means and one or the other of the transmitting means.

In the arrangement shown in Figs. 1, 2 and 3 the operation of the motor 35 is such as to maintain correspondence between the position of the pointers 1 and 21. Referring now particularly to Fig. 3, I have shown the contacts 12—13, 19—20, in the first transmitter (Fig. 1) and contacts 27—28, 33—34 in the second transmitter (Fig. 2) in diagrammatic form and the circuit connections therebetween. The system may be energized from any suitable source, such as indicated at 41, one side of which forms a neutral 42 to the contacts 19, 12, 33, and 27. Contact 20 is connected by a wire 43 to the winding 37 of the motor 35. Contact 34 is connected to the opposed winding 38 by a wire 44. Contacts 13 and 28 are connected by wires 45 and 46 to the common 47 of the motor 35.

It will be observed that with contacts 19—20 and 33—34 disengaged, windings 37 and 38 are deenergized. Upon engagement of contacts 19—20 winding 37 is short circuited, and upon engagement of contacts 33—34 winding 38 is short circuited. Assuming that contacts 19—20 engage first, it will further be observed that the winding 37 will be energized only until contacts 33—34 engage by virtue of the simultaneous disengagement of contacts 27—28. Likewise if contacts 33—34 engage first, winding 38 will be energized only until engagement of contacts 19—20 and simultaneous disengagement of contacts 12—13. If both sets of contacts simultaneously engage, both windings will remain deenergized. It is therefore apparent that the windings of the receiving means 35 will be selectively periodically energized for time increments dependent upon the relative magnitudes of the first and second variables.

The means I employ for maintaining the cams 16 and 31 in exact phase relation comprise means for periodically stopping the motor 32 if correct phase relationship does not exist until correct relationship is restored. The motor 32 is normally energized from source 41, lead 50, and return lead 51 through normally closed contacts 52 and 53 to the other side of the source. Once each revolution of the cam 31 these contacts are broken for a small predetermined increment of time by the follower 29 riding up on a lip 54. Simultaneously with this disengagement, however, (if proper phase relationship exists) the motor 32 will be energized from the source 41 through a lead 55 in which are connected normally open contacts 56—57. Contacts 56—57 are closed by the follower 14 riding up on a lip 58 of the cam 16. If proper phase relationship does not exist between cams 16 and 31 then the aforesaid sequential operation of contacts 52—53 and 56—57 will not occur, causing periodic deenergization of the motor 32 until proper phase relationship is restored.

To facilitate such double usage of the cams 16 and 31, and further to permit a different shape of the falling section of the cams I show connected in the common 47 of the motor 35 a mercury switch 60 for maintaining the common open during the portion of each revolution of the cam 31 designated as B'. As shown in Fig. 2, the mercury switch 60 is arranged to be actuated by the follower 29 so that during the rising section A' of the cam 31 the common is closed and during the remaining section B' the common is open so that regardless of the engagement or disengagement of contacts 19—20, 12—13, 27—28, and 33—34 the motor 35 remains stationary. If cams 16 and 31 are in proper phase relationship then sections A, B of cam 16 will correspond with sections A', B' of cam 31.

Figure 4:
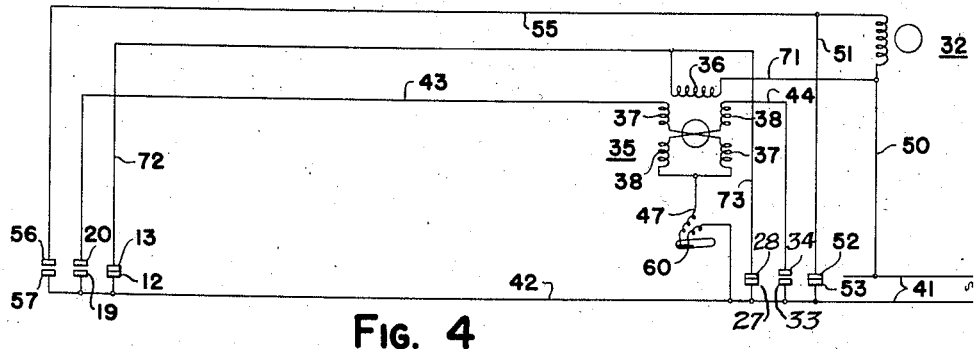
Fig. 4 is a modified form of the wiring shown in Fig. 3.

In Fig. 3 I show the energizing field 36 of the motor 35 directly connected to the source 41 through leads 70 and 71. In Fig. 4 I show a modified form of my invention wherein the contacts 12—13 and 27—28 are connected in circuit with the energizing field 36 rather than in circuit with the opposed windings 37, 38. Therein contacts 12—13 are connected to one side of the field 36 through a lead 72, whereas contacts 27—28 are connected to the same side of the field through a lead 73. If the circuit arrangement of Fig. 4 is used the operation is exactly the same as that described with reference to Figs. 1, 2 and 3. Assuming for example that contacts 19—20 engage first, opposed winding 37 will be energized by virtue of the fact that the energizing field 36 is energized through closed contacts 27—28. Upon closure of contacts 33—34, however, winding 37 will be deenergized because of the simultaneous opening of contacts 27—28. Conversely, if contacts 33—34 close first, winding 38 will be energized, but only until contacts 19—20 close and corresponding opening of contacts 12—13. It is thus evident that as with the circuit arrangement shown in Fig. 3 the arrangement shown in Fig. 4 will provide for the periodic selective energization of the opposed winding 37 or 38 for a time increment corresponding to the difference in magnitude of the two variables.

The rephasing operation carried on subsequent to loss of proper phase relationship between cams 16 and 31 may produce errors in the operation of the receiving means, which while of a minor character may cause undesirable fictitious changes in one or the other of the variables. Suitable means are shown in Figs. 5 and 6 which may be incorporated in either of the circuit arrangements shown in Figs. 3 and 4 for sounding an alarm or shutting down the entire system until manually reset.

Figure 5:
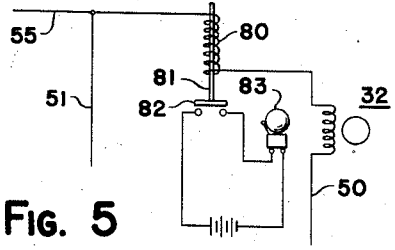
Figs. 5 and 6 illustrate modifications which may be incorporated in Figs. 3 and 4.

Referring to Fig. 5, I therein show connected in series circuit arrangement with the motor 32 a solenoid coil 80 and an armature 81 carrying a contact plate 82. When the contact plate is in open position, as shown, an alarm device herein shown as a bell 83 is open circuited. Upon failure of current to the motor 32 the solenoid 80 is deenergized, permitting the contact plate 82 to fall, thereby energizing the alarm device 83.

Figure 6:
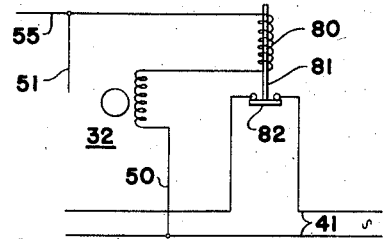

In Fig. 6 the contact plate 82 is shown arranged to open circuit the entire system, so that upon deenergization of motor 32 the entire system will be rendered inoperative. In both the modifications shown in Figs. 5 and 6 the armature 81 may be arranged to drop out of the magnetic field formed by the solenoid 80, so that upon restoration of the current to the motor 32 it is necessary to reset it by hand, or it may be arranged so that upon reenergization it automatically is restored to its normal position.

Figure 7:
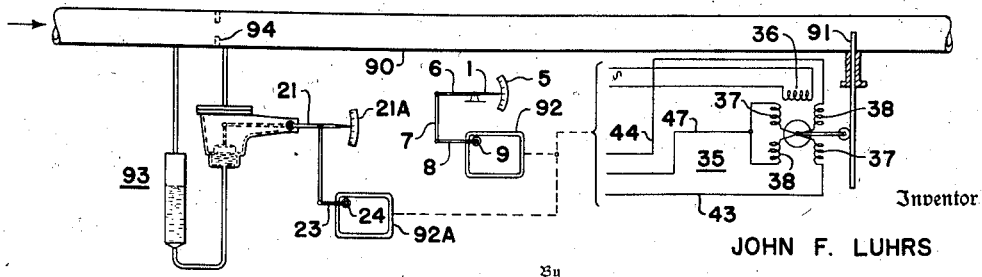
Fig. 7 illustrates a modification of my invention which may be used with the transmitting means shown in Figs. 1 and 2.

In Fig. 7 I have shown a modified form of my invention wherein the receiving means 35 is indirectly coupled to the indicator 21. As a specific embodiment I have shown a modification wherein the receiving means is arranged to regulate the rate of flow of fluid through a conduit 90 by positioning a valve 91 disposed therein. The transmitting means illustrated in Fig. 2 is indicated at 92A, and is arranged to be positioned by a flow meter 93 responsive to the differential produced by a restriction 94, which as known bears a functional relation to the rate of fluid flow through the conduit 90. The transmitting means shown in Fig. 1 is indicated at 92. The circuit arrangement between the two transmitting means and the receiving means 35 may be as shown in either Figs. 3 or 4. If desired to maintain the rate of fluid flow through the conduit 90 at some predetermined value, then the pointer 1 would be set at a position corresponding to that rate. Thereafter the receiving means would periodically position the valve 91 by an amount corresponding to the difference between the desired rate (as determined by the position of the pointer 1) and the actual rate (as determined by the position of the pointer 21) and in a sense to bring the actual rate into correspondence with the desired rate.

In other applications it may be desired to maintain the rate of fluid flow through the conduit 90 in predetermined ratio to the rate of fluid flow through a second conduit. In such applications I may cause the pointer 1 to be positioned by a flow meter, such as shown in 93, so that it is moved in correspondence with the rate of fluid flow through the second conduit. With this arrangement the receiving means will again vary the position of the valve 91 to maintain the rate of flow through the conduit 90 equal to or in desired proportion to the rate of fluid flow through the second conduit. It will be observed that in general the system disclosed in Fig. 7 operates to maintain a predetermined ratio between a first or independent variable and a second or dependent variable.

Figure 8:
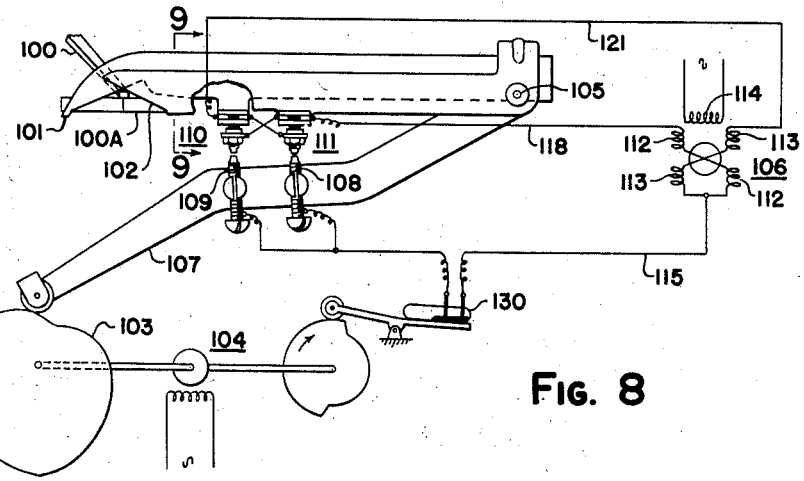
Fig. 8 illustrates a further modified form of my invention.
Figure 9:
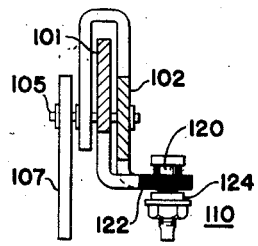
Fig. 9 is a sectional elevation view along the lines 9—9 of Fig. 8 in the direction of the arrows.
Figure 10:
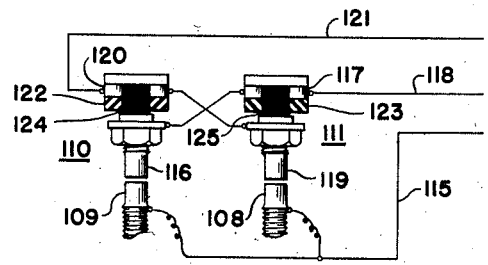
Fig. 10 is a fragmentary view to larger size of a part of the mechanism shown in Fig. 8.

In Figs. 8, 9 and 10 I show a further modified form of my invention somewhat different as to mechanical arrangement than the embodiments heretofore described, but embodying the same basic principles. Referring to the drawings, there is shown a movable pointer 100 which may be horizontally positioned along an anvil 100A by a variable responsive means, such as a galvanometer, flow meter, ammeter, etc. Two feelers 101 and 102 are adapted to be reciprocated about a bearing 105 by a cam 103 continuously rotated by a motor 104. Periodically the feeler 102 is brought into engagement with the pointer 100 for an increment of time corresponding to the distance of the pointer from the left-hand edge of the anvil 100A as viewed in the drawings. Concurrently the feeler 101 is brought into engagement with the pointer 100 for an increment of time corresponding inversely to the distance of the pointer from the left-hand edge of the anvil 100A. The feelers 101 and 102 are so shaped and relatively disposed that when the pointer 100 is in the mid point of the anvil 100A, or what is commonly termed the neutral position, their time of engagement therewith is identical. My invention, in general, contemplates periodically selectively energizing a reversible receiving means, such as diagrammatically indicated at 106, for a time increment corresponding to the difference in time length of engagement between the pointer 100 and feelers 101 and 102.

To periodically reciprocate the feelers 101 and 102 a cam follower 107 is provided, also pivoted on the bearing 105. Cam follower 107 carries contacts 108 and 109 which engage, through a portion of each reciprocation, contact assemblies 110 and 111 carried by the feelers 101 and 102 respectively. The contact assemblies 110 and 111 also serve as pick-ups for the feelers, so that the latter are reciprocated from one limit, determined by the rise of the cam 103, to another limit, determined by the position of the pointer 100. It is thus seen that the position of the pointer 100 will determine the relative time of closure during each cycle of contacts 109—110 and 108—111.

The receiving means 106 is shown as a motor having opposed pole windings 112, 113 and an energizing field 114. The circuit for the opposed winding 112 may be traced as follows: From common 115 to contact 109, cooperating contact 116, contact 117 to lead 118. The circuit for the winding 113 may be traced as follows: From common 115 to contact 108, cooperating contact 119, contact 120 to lead 121.

Referring now particularly to Figs. 9 and 10, it will be noted that the contact assemblies 110 and 111 comprise insulating bushings 122 and 123 which are carried by the feelers 101 and 102 respectively, and con-conducting members 124 and 125 movable in the bushings between limits. Normally, the members 124 and 125 are disposed by gravity, as shown, with contacts 117 and 120 closed. When, however, contact 108 engages contact 119, contact 117 is broken, and when contact 109 engages contact 116, contact 120 is broken. In operation, with the follower 107 in the position as shown windings 112 and 113 of the motor 106 are both open circuited inasmuch as contacts 109 and 108 are disengaged from contacts 116 and 119 respectively. When the follower 107 moves upwardly and assuming contact 108 engages contact 119 first, winding 112 will be short circuited, but only until contact 109 engages contact 116 when by virtue of contact 120 breaking winding 113 will be open circuited. Engagement of contacts 109 and 116 will not effect short circuiting of winding 112 inasmuch as contact 117 was broken by engagement of contacts 108 and 119. If contacts 109—116 and 108—119 simultaneously engage, then neither winding 112 or 113 will be short circuited, due to the simultaneous opening of contacts 17 and 120.

I may provide in the common 115 a suitable mercury switch 130 arranged to be actuated by the motor 104 so that only during the rising section of the cam 103 can the windings 112 and 113 be short circuited by closure of contacts 109—116 or 108—119.

Figure 11:
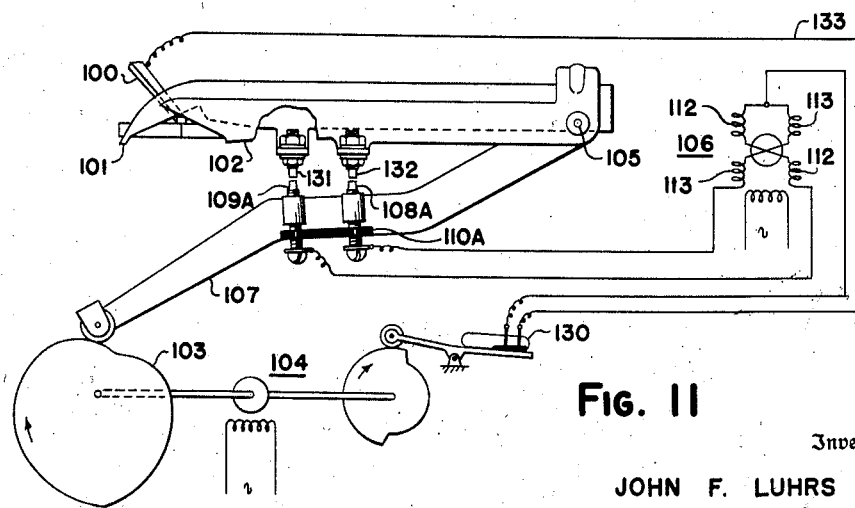
Fig. 11 illustrates a further modified form of my invention.

In Fig. 11 I show apparatus similar to that disclosed in Fig. 8 illustrating a further modified form of my invention. In this modification feelers 101 and 102 carry contacts 131 and 132 respectively disposed to be engaged by contacts 109A and 108A carried by a non-conducting bushing 110A on the cam follower 107. The common for the motor 106 includes the mercury switch 130 in lead 133, pointer 100, and the feelers 101 and 102. So long as the pointer 100 engages either or both feelers 101 and 102 contacts 131 and 132 will be electrically connected to the lead 133. Upon both feelers being disengaged from the pointer 100, then neither winding 112 or winding 113 can be short circuited by closure of contacts 109A—131 or 108A—132 respectively as lead 133 is electrically disconnected from contacts 131 and 132.

In operation, assuming contact 109A to engage the contact 131 first, the winding 112 will be energized until contact 108A engages contact 132, thereby causing feeler 102 to be lifted from the pointer 100, and thus opening the common of the windings 112 and 113. Similarly, if contact 108A engages contact 132 first, winding 113 of motor 106 will be energized, but only until contact 109A engages contact 131 lifting feeler 101 from the pointer 100 and breaking the common. It will be observed that the time duration of the short circuiting of either winding 112 or 113 is dependent upon the difference in time duration of closure of contacts 109A—131 and 108A—132, and that when these contacts simultaneously engage neither winding 112 or 113 is energized.

In the embodiments of my invention shown in Figs. 8 and 11, it will be observed that if contacts 108, 109 and 108A, 109A merely served to engage the contacts carried by the feelers 101 and 102, the windings 112 and 113 would be continuously energized for the time duration of such engagement. In the event of contact failure the motor 106 would rotate in one direction for the entire time duration of closure of the other contact. Such rotation would not correspond to the position of the pointer 100. With my invention the opposed windings of the motor 106 are energized only for the difference in time duration of the closure of the contacts, and upon failure of either contact the motor will remain stationary until the fault is remedied.

While I have not felt it necessary to illustrate the function of the motor 106, it will be evident to those skilled in the art that it may be used to rebalance a potentiometer system determining in part the position of the pointer 100, or that it may be used to control a variable, the magnitude of which, or departure from desired magnitude, is indicated by the position of the pointer 100.

The foregoing description and the drawings serve to emphasize that my invention can be found in various forms without change in substance. It should be understood, therefore, that the description and drawings merely serve to illustrate representative applications of my invention and are not to be considered as defining the scope thereof.

What I claim as new, and desire to secure by Letters Patent of the United States, is:

1. In a telemetric control system, receiving means having a first winding which when energized produces movement of the receiving means in one direction and a second winding which when energized produces movement of the receiving means in opposite direction, a first electric circuit for controlling energization of the first winding and a second electric circuit for controlling energization of the second winding, a first transmitting means including means for closing said first circuit and means operated electrically independently of said last named means for simultaneously opening said second circuit, and a second transmitting means including means for closing said second circuit and means operated electrically independently of said last named means for simultaneously opening said first circuit so that if either of the said means for closing the first or second circuits electrically fails neither of said windings is energized for the duration of said failure.

2. Telemetric apparatus comprising a receiving means having opposed windings, a first transmitting means for cyclically closing the circuit of one of the windings for a time duration corresponding to the magnitude of a first variable, a second transmitting means operated in synchronism with the first transmitting means for cyclically closing the circuit of the other of the windings for a time duration corresponding to the magnitude of a second variable, and mechanically operated means under the joint control of both the transmitting means for inhibiting operation of the receiving means for the duration of the circuit closure of shorter time duration.

3. Telemetric apparatus comprising a motor having opposed pole windings and an energizing winding, a first transmitting means for cyclically short circuiting one of the opposed pole windings for a time duration corresponding to the magnitude of a first variable, a second transmitting means operated in synchronism with the first transmitting means for cyclically short circuiting the other opposed pole winding for a time duration corresponding to the magnitude of a second variable, and means under the joint control of both said transmitting means for deenergizing the energizing winding of the receiving means during the time when both said opposed pole windings are short circuited.

4. Telemetric apparatus for cyclically producing an electric impulse corresponding in time duration to the difference in magnitude of two variables and receiver means responsive to said impulses, comprising a separate transmitting means for each variable, a separate means responsive to each variable, means including a cyclically operable means in each of said transmitting means cooperating with the said responsive means for originating an electric impulse at a point in each cycle corresponding to the magnitude of the variable, means in each transmitting means simultaneously actuated by said responsive means and said cyclically operable means independently of the means for originating an electric impulse for positively terminating the impulse originated by the other transmitting means so that upon failure of either of said means for originating an electric impulse no impulse is transmitted to said receiver means for the duration of the failure.

5. Telemetric apparatus comprising a receiving means having opposed windings and transmitting means for cyclically producing an electric impulse of a time duration corresponding to the difference in magnitude of two variables and including means for selectively energizing one or the other of said windings with said impulse in accordance with which one of said variables is of greater magnitude, comprising, a separate transmitting means for each variable including a member positioned in correspondence with the magnitude of the variable and cyclically operated means operated in synchronism and predetermined phase relationship, means including said member and said cyclically operable means for originating energization of a selected one of said windings at a point in each cycle of its operation corresponding to the position of said member, and means actuated by said member and said cyclically operable means independently of said means for originating energization of a selected one of said windings for terminating energization of the other of said windings so that if said means for originating energization of a selected one of said windings electrically fails energization of the other of said windings for the duration of the failure is inhibited.

6. Telemetric apparatus for cyclically producing an electric impulse corresponding in time duration to the amount of departure of two movable members from positions of correspondence and receiver means responsive to said impulses, comprising in combination, two movable members, a separate transmitting means associated with each of said members, cyclically operable means in each of said transmitting means cooperating with the associated member for originating an electric impulse at a point in each cycle corresponding to the position of the member, and means in each transmitting means mechanically actuated by the movable member and the cyclically operable means for terminating at a point in each cycle determined by the position of the member the impulse originated by the other transmitting means so that if either of said transmitting means fails to originate an electric impulse operation of said receiver means is inhibited for the duration of the failure.

7. In a telemetric control system, receiving means having a first winding which when energized produces movement of the receiving means in one direction, and a second winding which when energized produces movement of the receiving means in opposite direction, a first electric circuit for controlling energization of the first winding and a second electric circuit for controlling energization of the second winding, two switches in each of the circuits, a first transmitting means which when operated closes a switch in said first circuit and simultaneously electrically independent of the closure of said last name switch opens a switch in said second circuit, and a second transmititng means which when operated closes a switch in the second circuit and simultaneously electrically independent of the closure of said last named switch opens a switch in the first circuit, so that one or the other of the windings is energized solely for a time duration corresponding to the lapse of time between operation of the transmitting means and a selected one of the windings is energized as determined by which of the transmitting means is first operated.

8. Telemetric apparatus for cyclically producing an electric impulse corresponding in time duration to the amount of departure of two movable members from positions of correspondence and receiver means responsive to said impulses, comprising in combination, two movable members, a separate transmitting means associate with each movable member, means including a cyclically operable means in each of said transmitting means cooperating with the associated movable member for originating an electric impulse at a point in each cycle corresponding to the position of the movable member, means in each transmitting means simultaneously actuated by the movable member, and cyclically operable means independently of the means for originating an electric impulse for positively terminating the impulse originated by the other transmitting means so that upon failure of either of said means for originating an electric impulse no impulse is transmitted to said receiver means for the duration of the failure.

9. A telemetric system, comprising in combination, receiving means comprising electromagnetic means having a pair of opposed windings, two transmitting means for controlling the energization of said windings, each of said transmitting means comprising; a shaft, a transmitting arm angularly positionable about said shaft, a contact member pivotally mounted on said shaft and normally resting on said transmitting arm, a cam having a rising and a falling section, a follower member having one end pivoted on said shaft and the other engaging said cam; a motor for rotating said cam to periodically reciprocate said follower member through a predetermined cyclic course and carry said contact member through a portion of said cyclic course determined by the position of said transmitting arm, a first contact means mechanically operated by engagement of said follower member with said contact member to closed position, and a second contact means mechanically operated by disengagement of said contact member from said transmitting arm to open position; a separate circuit for energizing each of said windings, one of said circuits including the first contact means of one of the transmitting means and the second contact means of the other transmitting means, and the other of said circuits including the first contact means of said other transmitting means and the second contact means of said one of said transmitting means.

10. In a telemetric control system, in combination, receiving means having opposed windings, a first member and a second member, one of said members being adjustable relative to the other, a first transmitting means for cyclically closing the circuit of one of the windings for a time duration corresponding to the position of said first member, a second transmitting means operated in synchronism with the first transmitting means for cyclically closing the circuit of the other of the windings for a time duration corresponding to the position of said second member, and mechanically operated means under the joint control of both the transmitting means for inhibiting operation of the receiving means for the duration of the circuit closure of shorter time duration.

11. In a telemetric control system, in combination, receiving means comprising a motor having opposed pole windings and an energizing winding, a first adjustable transmitting means for cyclically short circuiting one of the opposed pole windings for a variable time duration, a second adjustable transmitting means operated in synchronism with the first transmitting means for cyclically short circuiting the other opposed pole winding for a variable time duration, and means under the joint control of both said transmitting means for deenergizing the energizing winding of the receiving means during the time when both said opposed pole windings are short circuited.

JOHN F. LUHRS.